T. C. DOBBINS.
TOOL FOR REPAIRING PNEUMATIC TIRES, &c.
APPLICATION FILED SEPT. 14, 1911.
1,051,490.
Patented Jan. 28, 1913.
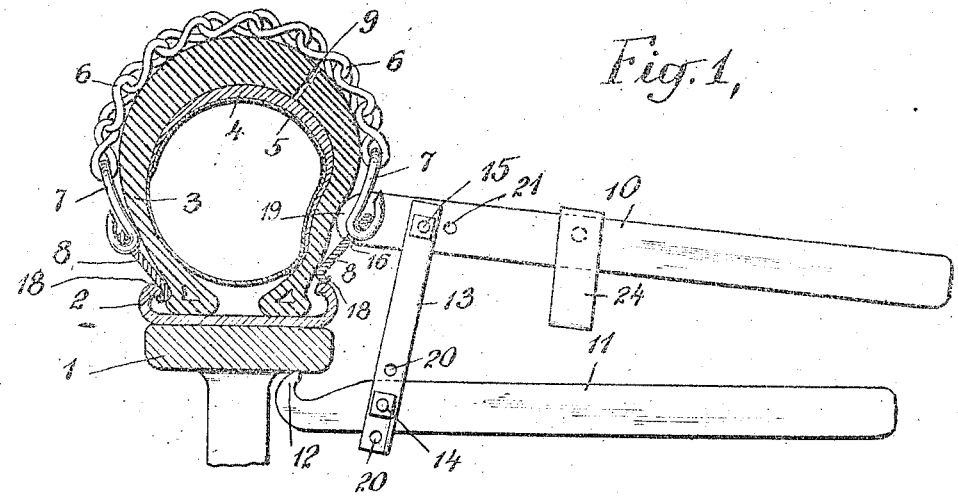
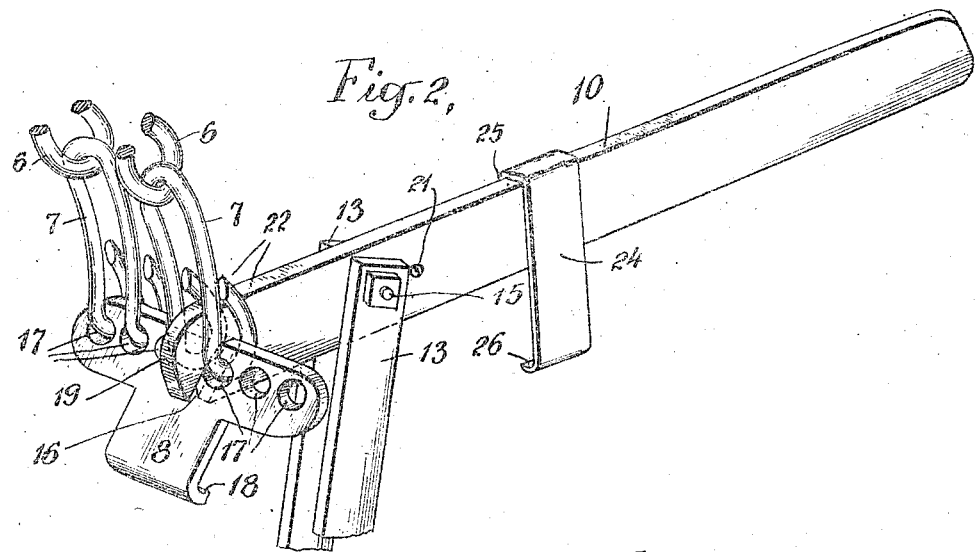
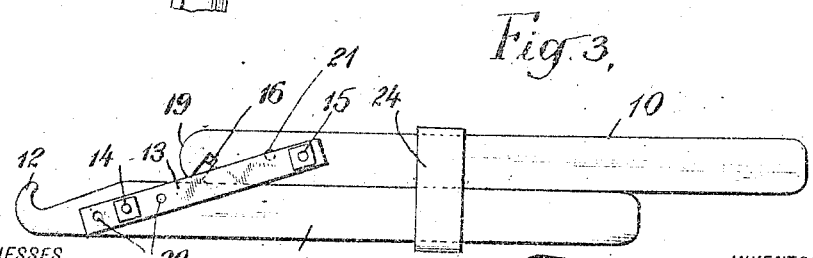
WITNESSES
INVENTOR
Timothy C. Dobbins
BY
Duncan & Duncan ATTORNEYS

UNITED STATES PATENT OFFICE.

TIMOTHY C. DOBBINS, OF LOS ANGELES, CALIFORNIA.

TOOL FOR REPAIRING PNEUMATIC TIRES, &c.

1,051,490.
Specification of Letters Patent.
Patented Jan. 28, 1913.

Application filed September 14, 1911. Serial No. 649,287.

*To all whom it may concern:*

Be it known that I, TIMOTHY C. DOBBINS, a citizen of the United States, and resident of Los Angeles, Los Angeles county, California, have made certain new and useful Inventions Relating to Tools for Repairing Pneumatic Tires, &c., of which the following is a specification, taken in connection with the accompanying drawing, forming part of the same.

This invention relates to tools especially adapted to apply to clencher pneumatic or resilient tire repairing devices comprising anchor plates coöperating with the clencher rim and a series of holding chains secured to said plates by attaching hooks as described in my copending application Serial No. 623,613 filed April 27, 1911. Said tool may comprise a flat inserting lever having a thin slotted gripping jaw capable of passing between said attaching hooks to support the connected anchor plate while forcing the same into holding engagement with the clencher rim, a coöperating flat holding lever to engage the wheel, pivot bars adjustably pivoting said levers together and promoting alinement thereof and also, if desired, a resilient retainer clip holding said coöperating levers in folded inoperative position.

In the accompanying drawings showing in a somewhat diagrammatic manner an illustrative embodiment of this invention, Figure 1 shows the tool as used in applying the repair device to a pneumatic tire. Fig. 2 is an enlarged perspective view showing the way in which the gripping jaw engages the anchor plate; and Fig. 3 is a view showing the tool in folded inoperative position.

In the illustrative embodiment of the invention shown in the drawing the repair device may be applied to the shoe 3 of a pneumatic tire supported by clencher rim 2 on the felly 1 of the wheel. A suitable patch 4 of reinforced rubber or the like may be inserted within the shoe so as to cover the puncture or tear 9 in the shoe so as to further support the inner tube 5 at that point.

The repair device may as indicated comprise the two anchor plates 8 curved to conform to the adjacent surface of the tire and provided with anchor lips or hooks 18 to engage and hold upon the inturned flange of the clencher rim so as to closely embrace the tire shoe and strongly embed themselves therein when the tire is inflated and thus protect and prevent substantial movement of these parts of the shoe. The chains 6 may each be secured to the plates by suitable attaching hooks 7, at each end of the chain, which have ends 22 which may be closed inwardly after passing through suitable holes 17 in the anchor plates. The inserting lever 10 of the tool may be formed of a flat bar or strip of steel or the like and be provided with the gripping head 19 of such thickness as to readily pass between the attaching hooks and be supported thereby so as to securely hold the connected anchor plate while forcing the same into holding engagement with the clencher rim. The gripping jaw may be provided with any suitable means for engaging the anchor plates, a suitable slot such as 16 being indicated for this purpose so as to prevent substantial movement of the anchor plates in the plane of the lever while undesirable transverse movement is prevented by the attaching hooks and connections on each side of the gripping jaw of this lever. The coöperating flat holding lever 11 may be connected in any suitable way with the inserting lever and preferably provided with a suitable holding point 12 so as to engage the felly, rim or other part of the wheel and give the proper support for the forcible insertion of the anchor plate between the tire and clencher flange. These levers may be conveniently connected by suitable pivoted connectors which may be in the form of the connector bars 13 embracing both the levers and having pivot bolts such as 14, 15 holding the bars against the flat sides of the levers so as to hold the levers in substantial alinement under operating conditions. Since it is desirable to have this pivoted connection adjustable, a series of pivot holes 20 may be formed at one or both ends of the bars 13 and a similar series of spaced pivot holes such as 21 may be formed in one or both of the operating levers so that in this way the levers may be loosely pivoted together in an adjustable manner to coöperate properly with different sizes or constructions of wheels. It is desirable to provide a suitable retaining device to securely hold the tool in the folded inoperative position indicated in Fig. 3 and this retaining device may be in the form of a resilient retainer clip 24 which may have one end 25 bent around one of the levers such as 10 and riveted or otherwise secured thereto and may have its free end provided with a suitable clip 26 to spring around the other lever 11 and yieldingly hold the same in closed position while allowing their ready disengagement when the tool is used for applying the tire repair device.

This invention has been described in connection with illustrative embodiments, forms, proportions, materials and arrangements of parts to the details of which disclosure the invention is not, of course, to be limited, since what is claimed as new and what is desired to be secured by Letters Patent is set forth in the appended claims.

I claim—

1. The tire repairing tool, adapted to apply to clencher tires, repairing devices comprising anchor plates adapted to coöperate with the clencher rim and attaching hooks secured to said plates, said tool comprising a flat inserting lever having a thin slotted gripping jaw capable of passing between said attaching hooks to securely support the connected anchor plate while forcing the same into holding engagement with the clencher rim, a coöperating flat holding lever having a holding point adapted to engage the wheel, a pair of connector bars embracing said levers, there being a series of pivot holes in said levers and bars, pivot bolts adjustably pivoting said bars to said levers and holding them against the flat sides of said levers to hold the same in alinement and a resilient retainer clip secured to one of said levers adapted to engage and hold closely against the same the coöperating lever in folded inoperative position.

2. The tire repairing tool, adapted to apply to clencher tires, repairing devices comprising anchor plates adapted to coöperate with the clencher rim and attaching hooks secured to said plates, said tool comprising a flat inserting lever having a thin slotted gripping jaw capable of passing between said attaching hooks to securely support the connected anchor plate while forcing the same into holding engagement with the clencher rim, a coöperating flat holding lever having a holding point adapted to engage the wheel, a pair of connector bars embracing said levers, there being a series of pivot holes in said levers and bars and pivot bolts adjustably pivoting said bars to said levers and holding them in coöperation with the flat sides of said levers to promote alinement thereof.

3. The tire repairing tool, adapted to apply to tires, repairing devices comprising anchor plates and attaching hooks secured to said plates, said tool comprising an inserting lever having a gripping jaw capable of coöperating with said attaching hooks to securely support the connected anchor plate while forcing the same into holding position, a coöperating holding lever to engage the wheel and a pair of connector bars pivoted to and embracing said levers, to promote alinement thereof.

4. The tire repairing tool, adapted to apply to clencher tires, repairing devices comprising anchor plates, said tool comprising an inserting lever having a gripping jaw provided with means adapted to engage both sides of an anchor plate to securely support the same while forcing it into holding engagement with the rim, a coöperating holding lever adapted to coöperate with the wheel and an adjustable pivoted connection between said levers promoting alinement thereof under working conditions.

5. The tire repairing tool, adapted to apply to tires, repairing devices comprising anchor plates adapted to coöperate with the clencher rim, said tool comprising an inserting lever having a gripping jaw adapted to engage on both sides and to support the anchor plate while forcing the same into holding engagement with the rim, a coöperating holding lever adapted to engage the wheel, a pivoted link connection between said levers promoting alinement thereof under working conditions and a retainer device secured to said levers to hold them in substantial contact throughout their length when folded together into inoperative position.

6. The tire repairing tool, adapted to apply to clencher tires, repairing devices comprising anchor plates adapted to coöperate with the clencher rim, said tool comprising an inserting lever having a gripping jaw adapted to engage on both sides and to securely support the anchor plate while forcing the same into holding engagement with the clencher rim, a coöperating holding lever adapted to engage the wheel and a pivoted link connection between said levers promoting alinement thereof under working conditions.

TIMOTHY C. DOBBINS.

Witnesses:
HARRY L. DUNCAN,
JESSIE B. KAY.